(12) United States Patent
Derouineau

(10) Patent No.: US 7,285,871 B2
(45) Date of Patent: Oct. 23, 2007

(54) ENGINE POWER EXTRACTION CONTROL SYSTEM

(75) Inventor: Jean-Luc Derouineau, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 287 days.

(21) Appl. No.: 11/182,550

(22) Filed: Jul. 15, 2005

(65) Prior Publication Data
US 2006/0042252 A1   Mar. 2, 2006

Related U.S. Application Data

(60) Provisional application No. 60/604,611, filed on Aug. 25, 2004.

(51) Int. Cl.
H02P 9/00 (2006.01)
(52) U.S. Cl. ........................................ 290/52
(58) Field of Classification Search ............... 290/52
See application file for complete search history.

(56) References Cited

U.S. PATENT DOCUMENTS

| | | | | |
|---|---|---|---|---|
| 2,095,991 | A | * | 10/1937 | Lysholm ..................... 60/773 |
| 3,465,162 | A | * | 9/1969 | Oprecht ..................... 290/4 R |
| 3,786,696 | A | | 1/1974 | Aleem |
| 4,403,292 | A | | 9/1983 | Ejzak et al. |
| 4,572,961 | A | | 2/1986 | Borger |
| 4,684,081 | A | | 8/1987 | Cronin |
| 4,694,187 | A | | 9/1987 | Baker |
| 4,908,565 | A | | 3/1990 | Cook et al. |
| 4,912,921 | A | | 4/1990 | Rice et al. |
| 4,967,098 | A | | 10/1990 | Diemer et al. |
| 5,309,029 | A | | 5/1994 | Gregory et al. |
| 5,432,383 | A | * | 7/1995 | Kawamura ................. 290/14 |
| 5,694,765 | A | | 12/1997 | Hield et al. |
| 5,783,932 | A | | 7/1998 | Namba et al. |
| 5,845,483 | A | | 12/1998 | Petrowicz |
| 5,899,411 | A | | 5/1999 | Latos et al. |
| 6,124,646 | A | | 9/2000 | Artinian et al. |
| 6,142,418 | A | | 11/2000 | Weber et al. |
| 6,344,700 | B1 | | 2/2002 | Eisenhauer et al. |
| 6,467,725 | B1 | | 10/2002 | Coles et al. |
| 6,527,660 | B1 | | 3/2003 | Sugden |
| 6,561,940 | B2 | | 5/2003 | Goi et al. |
| 6,631,703 | B2 | | 10/2003 | Tonnqvist et al. |
| 6,672,049 | B2 | | 1/2004 | Franchet et al. |
| 6,825,640 | B1 | | 11/2004 | Hill et al. |
| 6,895,741 | B2 | | 5/2005 | Rago et al. |
| 6,900,553 | B2 | * | 5/2005 | Gozdawa ..................... 290/52 |
| 6,914,344 | B2 | * | 7/2005 | Franchet et al. ............. 290/52 |
| 7,224,082 | B2 | * | 5/2007 | Bouiller et al. ............... 290/52 |

* cited by examiner

*Primary Examiner*—Joseph Waks
(74) *Attorney, Agent, or Firm*—Ingrassia Fisher & Lorenz

(57) ABSTRACT

An engine power extraction control system controls the main propulsion engines and the electrical machines that are coupled thereto to supply an appropriate amount of aircraft thrust and electrical energy to the aircraft. The engines and electrical machines are also controlled so that the propulsion thrust that is generated is split between the various turbines in the main propulsion engines to maintain an adequate surge margin and to minimize residual thrust generation.

19 Claims, 3 Drawing Sheets

US 7,285,871 B2

ENGINE POWER EXTRACTION CONTROL SYSTEM

CROSS-REFERENCES TO RELATED APPLICATIONS

This application claims the benefit of U.S. Provisional Application No. 60/604,611, filed Aug. 25, 2004.

TECHNICAL FIELD

The present invention relates to engine power control and, more particularly, to a system and method of controller engine thrust generation by, and power extraction from, an aircraft main propulsion engine.

BACKGROUND

Aircraft main propulsion engines not only generate propulsion thrust for the aircraft, but in many instances may also be used to drive various other rotating components such as, for example, generators, compressors, and pumps, to thereby supply electrical, pneumatic, and/or hydraulic power. In multi-spool turbofan gas turbine engines, this is accomplished via a plurality of turbines. In particular, each turbine receives a flow of combusted gas from a combustor and, in response, generates shaft power that is used to drive one or more of these rotational components, via a plurality of concentric shafts. Thus, a portion of the shaft power that each turbine generates is used to provide propulsion thrust, while another portion of the generated shaft power is extracted and used to drive these other rotational components.

In recent years, aircraft architectures are being provided that rely that more and more on electrical power, and less on pneumatic (e.g., bleed air) and/or hydraulic power. In such architectures, shaft power extraction demand can increase significantly. For example, shaft power extraction demand can be as much as 200% to 300% more than traditional solutions such as bleed air and/or hydraulic power. Although these architectures are generally safe, robust, and reliable, the architectures may suffer certain drawbacks. For example, high shaft power extraction demand can negatively impact compressor surge margin. A relatively straightforward technique to mitigate this drawback is to increase the engine speed and bleed during high shaft power extraction demands. This solution, however, can increase both the fuel burn rate and the residual thrust that the engine generates, most notably during flight and ground idle conditions and during transients.

Hence, there is a need for a system and method for a more electric aircraft architecture that improves the surge margin of the propulsion engine compressors and/or improves engine operability and/or, at least during high power extraction demands, reduces fuel burn rate and/or reduces the residual thrust that the engines generate. The present invention addresses one or more of these needs.

BRIEF SUMMARY

The present invention provides a system and method for a more electric aircraft architecture that improves the surge margin of the propulsion engine compressors and improves overall engine operability during high power extraction demands.

In one embodiment, and by way of example only, an engine power extraction control system for an aircraft includes a gas turbine engine, a first generator, a second generator, a first generator control unit, a second generator control unit, and an engine power extraction control circuit. The gas turbine engine includes at least a high pressure turbine and a low pressure turbine, each of which is adapted to receive a flow of combusted gas and is operable, upon receipt thereof, to generate rotational energy. The first generator is coupled to receive at least a portion of the rotational energy generated by the high pressure turbine and is operable, upon receipt thereof, to generate electrical energy. The second generator is coupled to receive at least a portion of the rotational energy generated by the low pressure turbine and is operable, upon receipt thereof, to generate electrical energy. The first generator control unit is electrically coupled to the first generator, and is coupled to receive generator commands and is operable, upon receipt thereof, to control the electrical energy generated by the first generator, whereby rotational energy extraction from the high pressure turbine, by the first generator, is controlled. The second generator control unit is electrically coupled to the second generator, and the second generator control unit is coupled to receive generator commands and is operable, upon receipt thereof, to control the electrical energy generated by the second generator, whereby rotational energy extraction from the low pressure turbine, by the second generator, is controlled. The engine power extraction control circuit is adapted to receive aircraft operational data representative of aircraft thrust and electrical load requirements and is operable, upon receipt thereof, to supply the generator commands to the first and second generator control units.

In another exemplary embodiment, in an aircraft having a gas turbine engine that includes at least a high pressure turbine and a low pressure turbine each operable to generate rotational energy, a method of controlling rotational energy extracted from each turbine includes the steps of converting an amount of the rotational energy generated by the high pressure turbine into electrical energy, and converting an amount of the rotational energy generated by the low pressure turbine into electrical energy. Aircraft thrust and electrical load requirements are determined. Based on the determined aircraft thrust and electrical load requirements the amount of rotational energy generated the high pressure turbine that is converted into electrical energy is controlled, to thereby control the rotational energy extracted from the high pressure turbine, and the amount of rotational energy generated the low pressure turbine that is converted into electrical energy is controlled, to thereby control the rotational energy extracted from the low pressure turbine.

Other independent features and advantages of the preferred engine power extraction control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine. Thus, although the present embodiment is, for convenience of explanation, depicted and described as being implemented in combination with a multi-spool turbofan gas turbine jet engine, it will be appreciated that it can be implemented in various other types of turbines, and in various other systems and environments.

Figure 1:
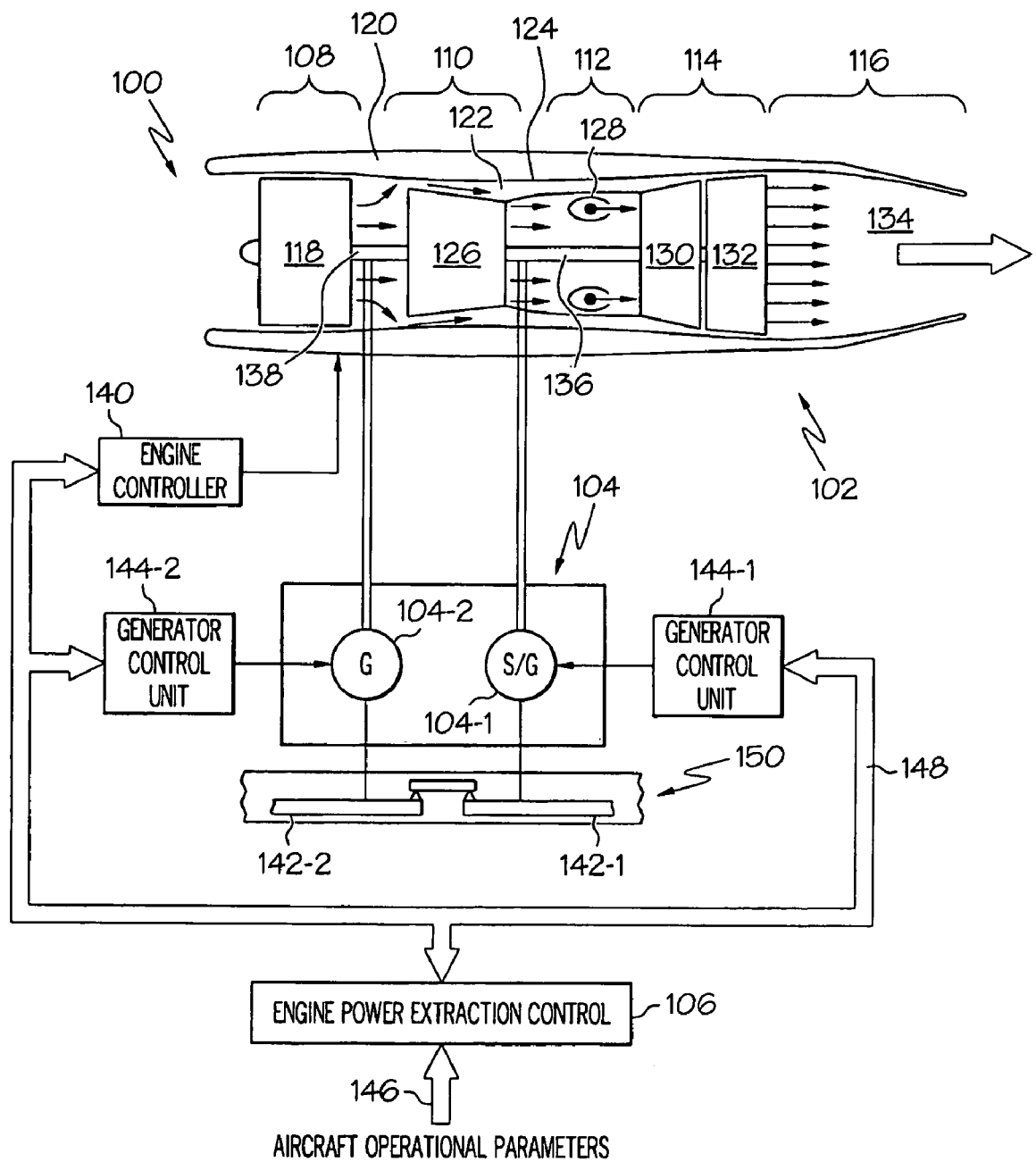
FIG. 1 is a schematic representation of an engine power extraction control system according to an embodiment of the present invention for use with a dual-spool engine.

Turning now to FIG. 1, an embodiment of an exemplary engine power extraction system 100 is shown in schematic form. The system 100 includes a main propulsion engine 102, a plurality of electrical machines 104 (e.g., 104-1, 104-2), and an engine power extraction control circuit 106. In the depicted embodiment, the main propulsion engine 102 is a multi-spool turbofan gas turbine jet engine, and includes an intake section 108, a compressor section 110, a combustion section 112, a turbine section 114, and an exhaust section 116. The intake section 108 includes a fan 118, which is mounted in a fan case 120. The fan 118 draws air into the intake section 108 and accelerates it. A fraction of the accelerated air exhausted from the fan 118 is directed through a bypass section 122 disposed between the fan case 120 and an engine cowl 124, and generates propulsion thrust. The remaining fraction of air exhausted from the fan 118 is directed into the compressor section 110.

The compressor section 110 may include one or more compressors 126, which raise the pressure of the air directed into it from the fan 118, and directs the compressed air into the combustion section 112. In the depicted embodiment, only a single compressor 126 is shown, though it will be appreciated that one or more additional compressors could be used. In the combustion section 112, which includes a combustor assembly 128, the compressed air is mixed with fuel supplied from a fuel source (not shown). The fuel/air mixture is combusted, generating high energy combusted gas that is then directed into the turbine section 114.

The turbine section 114 includes one or more turbines. In the depicted embodiment, the turbine section 114 includes two turbines, a high pressure turbine 130, and a low pressure turbine 132. However, it will be appreciated that the propulsion engine 102 could be configured with more or less than this number of turbines. No matter the particular number, the combusted gas from the combustion section 112 expands through each turbine 130, 132, causing it to rotate. The gas is then exhausted through a propulsion nozzle 134 disposed in the exhaust section 116, generating additional propulsion thrust. As the turbines 130, 132 rotate, each drives equipment in the main propulsion engine 102 via concentrically disposed shafts or spools. Specifically, the high pressure turbine 130 drives the compressor 126 via a high pressure spool 136, and the low pressure turbine 132 drives the fan 118 via a low pressure spool 138.

As FIG. 1 additionally shows, the main propulsion engine 102 is controlled, at least partially, by an engine controller 140 such as, for example, a FADEC (Full Authority Digital Engine Controller). The engine controller 140 controls the operation of the main propulsion engine 102. More specifically, the engine controller 140 controls the amount of rotational energy that the high pressure and low pressure turbines 130, 132 generate.

During operation of the main propulsion engine 100, the high pressure turbine 130 and the low pressure turbine 132, in addition to driving the compressor 126 and fan 118, also drive individual ones of the plurality of electrical machines 104. More specifically, the high pressure turbine 130 is coupled, via the high pressure spool 136, to a first electrical machine 104-1, and the low pressure turbine 132 is coupled, via the low pressure spool 138, to a second electrical machine 104-2. The first and second electrical machines 104-1, 104-2 are in turn electrically coupled to electrically isolable distribution buses 142-1, 142-2, respectively, that form part of an aircraft power distribution system 150.

In a particular preferred embodiment, the first electrical machine 104-1 is implemented as a starter-generator, and the second electrical machine 104-2 is implemented as generator. As such, the first electrical machine 104-1, when properly energized, is configured to operate in either a motor mode, in which electrical energy from the power distribution system 150 is converted to rotational energy and supplied to the high pressure turbine 130, or a generator mode, in which rotational energy from the high pressure turbine 130 is converted to electrical energy and supplied to the power distribution system 150. The second electrical machine 104-2, when properly energized, is configured to only operate in a generator mode, and to convert rotational energy supplied from the low pressure turbine 132 to electrical energy for the power distribution system 150. It will be appreciated that the system 100 could be implemented such that the electrical machines 104-1, 104-2 are both generators or are both starter-generators.

The first electrical machine 104-1 is typically configured to operate in the motor mode in order to start the main propulsion engine 102. Once the main propulsion engine 102 is started and running, the first electrical machine 104-1 is then configured to operate in the generator mode, and the second electrical machine 104-2 is then properly energized, as needed, to generate electrical energy. It will be appreciated that the first electrical machine 104-1 may be implemented as either an AC or DC starter-generator, and the second electrical machine 104-2 may be implemented as any one of numerous types of AC or DC generators.

The first and second electrical machines 104-1 and 104-2 are controlled via first and second generator control units 144-1 and 144-2, respectively. More specifically, the first and second generator control units 144-1, 144-2 each receive generator commands from the engine power extraction control circuit 106. In response to the generator commands, the first generator control unit 144-1 configures the first electrical 104-1 to operate in either the motor mode or the generator mode, and the second generator control unit 144-2 configures the second electrical machine 104-2, upon rotation thereof, to either generate electrical energy or not generate electrical energy. The first and second generator control units 144-1, 144-2, also in response to the generator commands supplied from the power extraction control circuit 106, independently control, in a conventional manner, the amount of electrical energy generated by the first and second electrical machines 104-1, 104-2, respectively.

As was noted above, the engine power extraction control circuit 106 communicates with the engine controller 140, and supplies generator commands to each of the generator control units 144-1, 144-2. As was also noted above, the engine controller 106 controls the amount of rotational energy that the high pressure and low pressure turbines 130, 132 generate, and the generator control units 144-1, 144-2, in response to the generator commands, control the amount of electrical energy that the first and second electrical machines 104-1, 104-2 generate. Thus, the engine power extraction control circuit 106, via the engine controller 140 and the generator control units 144-1, 144-2, controls and balances the amount of rotational energy that the first and second electrical machines 104-1, 104-2 individually extract from the high pressure and low pressure turbines 130, 132 and convert to electrical energy, in order to supply the desired amount of electrical power within the engine operability/efficiency envelope. It will be appreciated that although the engine power extraction control circuit 106 is depicted as being implemented as a single, separate circuit within the system 100, this implementation is merely exemplary. Indeed, the engine power extraction control circuit 106 could be implemented either partially, or wholly, in the engine controller 140, either or both generator control units 144-1, 144-2, in the aircraft avionics suite (not shown), or one or more combinations of these devices.

The amount of rotational energy that is generated by, and extracted from, each turbine 130, 132 will depend, at least partially, on the thrust and electrical load requirements of the aircraft. The engine power extraction control circuit 106 determines these thrust and electrical requirements from various aircraft operational parameters. For example, engine thrust setting, high pressure turbine rotational speed, low pressure turbine rotational speed, aircraft altitude, aircraft speed, aircraft electrical system configuration, aircraft electrical system load, and atmospheric pressure and temperature outside the aircraft, just to name a few, can be used to determine the aircraft thrust and electrical load requirements.

The aircraft operational parameters are preferably supplied to the engine power extraction control circuit 106, via a digital communications data link 146, from one or more systems or circuits. For example, these data could be supplied directly from dedicated sensors, from the avionics system installed in the aircraft, or from any one of numerous other systems or components within the aircraft that use one or more of these data. No matter the specific source of the data, the engine power extraction control circuit 106 is configured to process the received data and supply the generator commands, preferably via a second digital communications link 148, that will cause the electrical machines 104 to supply the appropriate amount of electrical energy to the aircraft. The supplied engine and generator commands will also result in power extraction to be appropriately split between the high pressure and low pressure turbines 130, 132, to maintain an adequate surge margin and to minimize residual thrust generation when operating close to idle speed.

Figure 2:
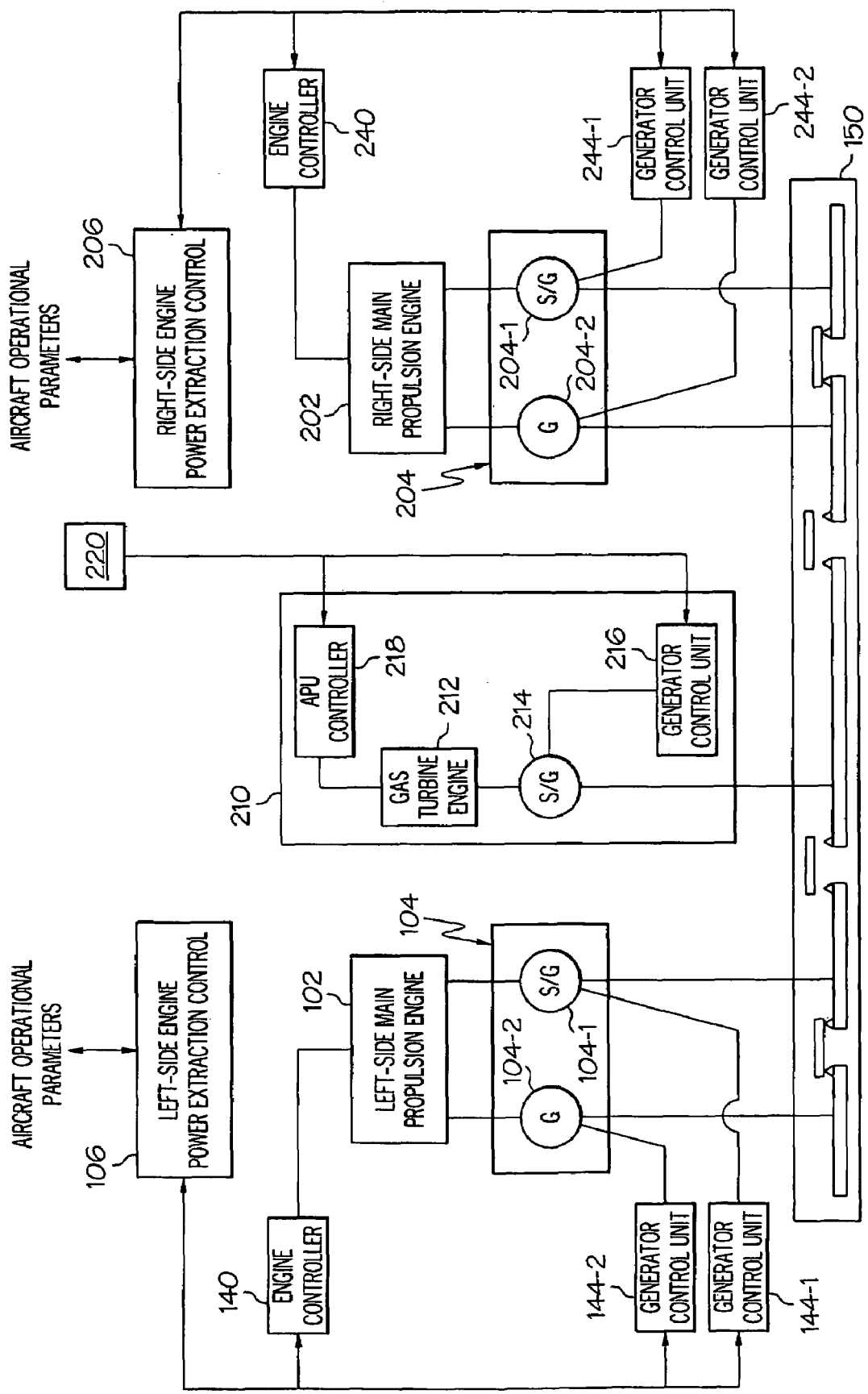
FIG. 2 is a schematic representation of an engine power extraction control system for an aircraft architecture that includes two main propulsion engines and an auxiliary power unit.

The system described above and shown in FIG. 1 includes only a single main propulsion engine 102. It will be appreciated, however, that in an alternative embodiment, the system could be implemented in an aircraft that includes more that one main propulsion engine 102. For example, an alternate engine power extraction system 200, for an aircraft that includes two main propulsion engines 102, 202 is shown in FIG. 2. In such aircraft, the main propulsion engines 102, 202 are typically disposed on opposite sides of the aircraft. As such, the main propulsion engines 102 and 202 may be referred to as the left-side main propulsion engine 102 and the right-side main propulsion engine 202, respectively.

No matter the specific nomenclature that is used to identify the individual main propulsion engines 102, 202, it is seen that the left-side and right-side engines 102, 202 are coupled to left-side and right-side engine controllers 140, 240, respectively and to a plurality of left-side and right-side electrical machines 104 (104-1, 104-2), 204 (204-1, 204-2), respectively. It is further seen that the left-side and right-side electrical machines 104-1, 104-2 and 204-1, 204-2 are coupled to individual left-side and right-side generator control units 144-1, 144-2 and 244-1, 244-2, respectively. It will be appreciated that the left-side and right-side main propulsion engines 102, 202, the left-side and right-side engine controllers 140, 240, the left-side and right-side electrical machines 104-1, 104-2, 204-1, 204-2, and left-side and right-side generator control units 144-1, 144-2, 244-1, 244-2 each operate identical to those previously described, and will therefore not be further described.

As FIG. 2 additionally shows, the left-side and right-side engine controllers 140, 240 communicate with independent left-side and right-side engine power extraction control circuits 106, 206, respectively, and left-side and right-side generator control units 144-1, 144-2, 244-1, 244-2 are each coupled to receive generator commands from the independent left-side and right-side engine power extraction control circuits 106, 206, respectively. The independent left-side and right-side engine power extraction control circuits 106, 206 are preferably physically separate from one another, but could be disposed within the same housing. The left-side and right-side engine power extraction control circuits 106, 206 each operate substantially identical to the engine power extraction control circuit 106 described above. That is the left-side and right-side engine power extraction control circuits 106, 206 each separately receive aircraft operational data representative of aircraft thrust and electrical load requirements, independently process the received data, and independently supply generator commands to the left-side and right-side generator control units 144-1, 144-2 and 244-1, 244-2.

As in the previous embodiment, the generator commands cause the left-side and right-side main propulsion engines 102, 202 and the left-side and right-side electrical machines 104, 204 to supply the appropriate amount electrical energy to the aircraft, and result in the power extraction to be appropriately split between the high pressure and low pressure turbines 130, 132 (not shown in FIG. 2) in the left-side and right-side main propulsion engines 102, 202, to maintain an adequate surge margin and to minimize residual thrust generation when operating close to idle speed.

The system 200 depicted in FIG. 2, unlike that shown in FIG. 1, further includes an auxiliary power unit (APU) 210. In the depicted embodiment, the APU 210 includes a gas turbine engine 212, a starter-generator 214, a generator control unit 216, and an APU controller 218. The APU gas turbine engine 212 may be implemented using any one of numerous gas turbine engines now known or developed in the future, that combust a fuel/air mixture to generate combustion gas, and generates rotational energy, via one or more turbines, using the combusted gas.

The APU starter-generator 214, similar to those previously described herein, is configured to operate in either a motor mode or a generator mode. In the motor mode, the APU starter-generator 214 converts electrical energy from the power distribution system 150 to rotational energy, which is supplied to the APU gas turbine engine 212. In the generator mode, the APU starter-generator 214 converts rotational energy from the APU gas turbine engine 212 to electrical energy, which is supplied to the power distribution system 150.

The APU starter-generator 214 mode, and the amount of energy that the APU starter-generator 214 generates, is controlled via the APU generator control unit 216. The APU controller 218, similar to the previously disclosed engine controllers 106, 206, control the amount of rotational energy that the APU gas turbine engine 212 generates. The APU generator controller 216 and the APU controller 218 implement these functions in response to APU generator commands and APU engine commands, respectively. These APU commands may be supplied from either the left-side engine power extraction control circuit 106, the right-side engine power extraction control circuit 206 or, as shown in FIG. 3, from a separate external circuit 220.

In the introductory paragraph of this detailed description, it was mentioned that the main propulsion engines 102, 202 disclosed herein could be implemented as other multi-spool gas turbine engines. An exemplary embodiment of a system 300 that is implemented with a three-spool engine 302 is shown in FIG. 3, and will now be briefly described.

As is generally known, three-spool engines 302 include an intake section 304, a combustion section 308, and an exhaust section 312 that are similar in general structure and overall function to the previously described dual-spool engine 102, 202. However, the compressor section 306 and the turbine section 310 differ, in that the compressor section 306 includes an intermediate pressure compressor 314 and a high pressure compressor 316, and the turbine section 310 includes a high pressure turbine 318, an intermediate pressure turbine 320, and a low pressure turbine 322. When the turbines 318-322 rotate, each drives equipment in the engine 302 via concentrically disposed shafts or spools. Specifically, the high pressure turbine 318 drives the high pressure compressor 316 via a high pressure spool 324, the intermediate pressure turbine 320 drives the intermediate pressure compressor 314 via an intermediate pressure spool 326, and the low pressure turbine 322 drives the fan 118 via a low pressure spool 328.

Figure 3:
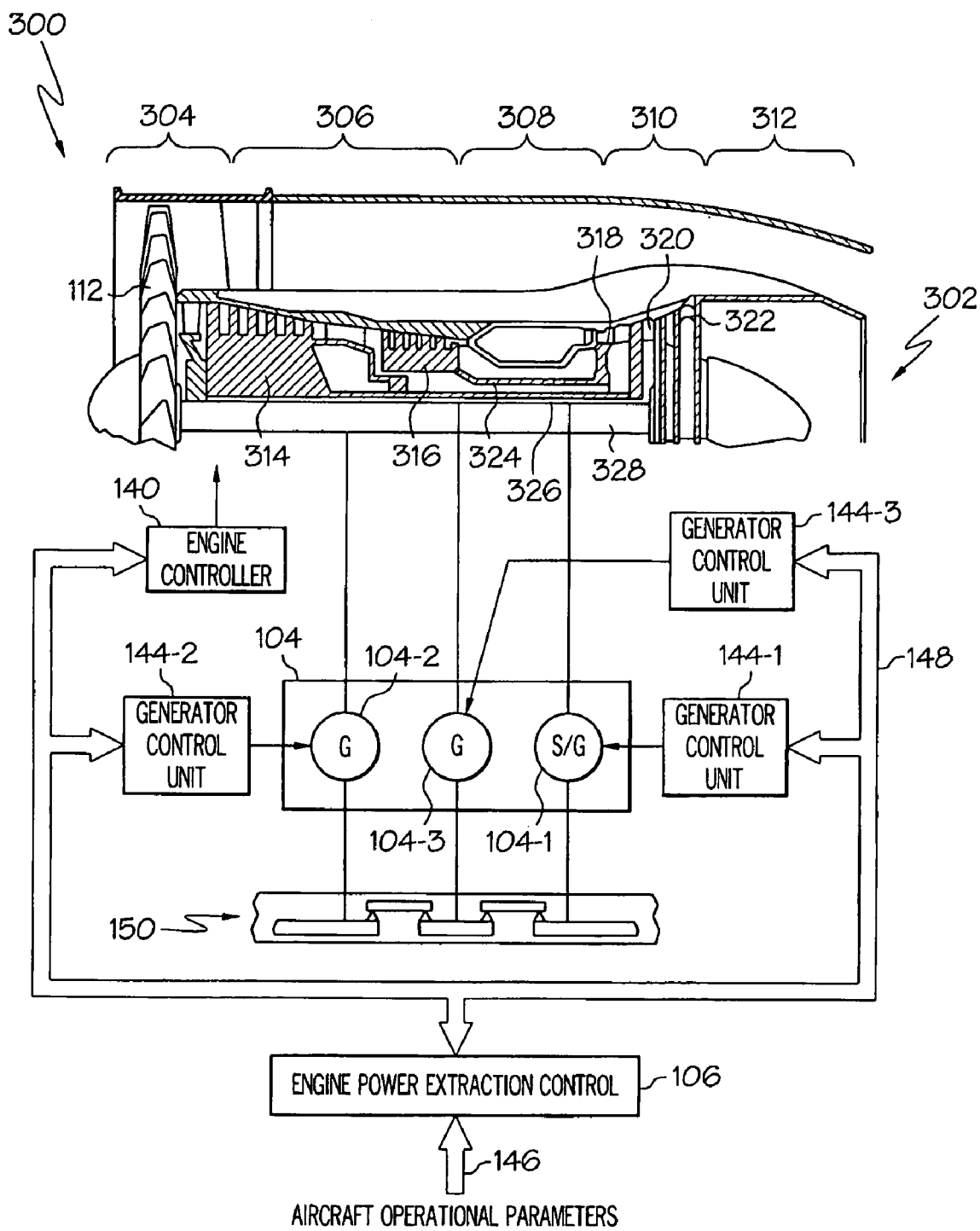
FIG. 3 is a schematic representation of yet another exemplary engine power extraction control system for a three-spool engine.

The system 300 shown in FIG. 3 is configured substantially identical to, and functions substantially identical to, the systems 100, 200 previously described. However, the system 300 includes an additional electrical machine 104-3, which is preferably implemented as an AC or DC generator, coupled to the intermediate pressure spool 326, and an additional generator controller 144-3. The engine power extraction control circuit 106 is thus further configured to supply generator commands to the third generator control unit 144-3 to additionally control the amount of rotational energy that the third electrical machine 104-3 extracts from the intermediate pressure turbine 320 and converts to electrical energy.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An engine power extraction control system for an aircraft, comprising:
a gas turbine engine including at least a high pressure turbine and a low pressure turbine, each turbine adapted to receive a flow of combusted gas and operable, upon receipt thereof, to generate rotational energy;
a first generator coupled to receive at least a portion of the rotational energy generated by the high pressure turbine and operable, upon receipt thereof, to generate electrical energy;
a second generator coupled to receive at least a portion of the rotational energy generated by the low pressure turbine and operable, upon receipt thereof, to generate electrical energy;
a first generator control unit electrically coupled to the first generator, the first generator control unit coupled to receive generator commands and operable, upon receipt thereof, to control the electrical energy generated by the first generator, whereby rotational energy extraction from the high pressure turbine, by the first generator, is controlled;
a second generator control unit electrically coupled to the second generator, the second generator control unit coupled to receive generator commands and operable, upon receipt thereof, to control the electrical energy generated by the second generator, whereby rotational energy extraction from the low pressure turbine, by the second generator, is controlled; and
an engine power extraction control circuit adapted to receive aircraft operational data representative of aircraft thrust and electrical load requirements and operable, upon receipt thereof, to supply the generator commands to the first and second generator control units.

2. The system of claim 1, wherein:
the first generator is a starter-generator that is configured to selectively operate in either (i) a motor mode, in which electrical energy is converted to rotational energy and supplied to the high pressure turbine or (ii) a generator mode, in which the rotational energy supplied thereto from the high pressure turbine is converted to electrical energy; and
the first generator control unit is further operable to selectively configure the starter-generator to operate in either the motor mode or the generator mode.

3. The system of claim 1, wherein the gas turbine engine further includes an intermediate pressure turbine that is adapted to receive a flow of combusted gas and operable, upon receipt thereof, to generate rotational energy, and wherein the system further comprises:
a third generator coupled to receive at least a portion of the rotational energy generated by the intermediate pressure turbine and operable, upon receipt thereof, to generate electrical energy;
a third generator control unit electrically coupled to the third generator, the third generator control unit coupled to receive generator commands and operable, upon receipt thereof, to control the electrical energy generated by the third generator, whereby rotational energy extraction from the intermediate pressure turbine, by the third generator, is controlled,
wherein the engine power extraction control circuit is further operable to supply the generator commands to the third generator control unit.

4. The system of claim 1, further comprising:
a second gas turbine engine including at least a high pressure turbine and a low pressure turbine, each turbine adapted to receive a flow of combusted gas and operable, upon receipt thereof, to generate rotational energy;

a third generator coupled to receive at least a portion of the rotational energy generated by the second gas turbine engine high pressure turbine and operable, upon receipt thereof, to generate electrical energy;

a fourth generator coupled to receive at least a portion of the rotational energy generated by the second gas turbine engine low pressure turbine and operable, upon receipt thereof, to generate electrical energy;

a third generator control unit electrically coupled to the third generator, the third generator control unit coupled to receive generator commands and operable, upon receipt thereof, to control the electrical energy generated by the third generator;

a fourth generator control unit electrically coupled to the fourth generator, the fourth generator control unit coupled to receive generator commands and operable, upon receipt thereof, to control the electrical energy generated by the fourth generator; and a second engine power extraction control circuit adapted to receive the aircraft operational data and operable, upon receipt thereof, to supply the generator commands to the third and fourth generator control units.

5. The system of claim 4, wherein:
the first and third generators are each starter-generators that are configured to selectively operate in either (i) a motor mode, whereby electrical energy is converted to rotational energy and supplied to the high pressure turbine or (ii) a generator mode, whereby the rotational energy supplied thereto from the high pressure turbine is converted to electrical energy; and the first and third generator control units are further operable to selectively configure the first and third starter-generators, respectively, to operate in either the motor mode or the generator mode.

6. The system of claim 4, wherein the first and second gas turbine engines each further include an intermediate pressure turbine that is adapted to receive a flow of combusted gas and operable, upon receipt thereof, to generate rotational energy, and wherein the system further comprises:

a fifth generator coupled to receive at least a portion of the rotational energy generated by the first gas turbine engine intermediate pressure turbine and operable, upon receipt thereof, to generate electrical energy;

a sixth generator coupled to receive at least a portion of the rotational energy generated by the second gas turbine engine intermediate pressure turbine and operable, upon receipt thereof, to generate electrical energy;

a fifth generator control unit electrically coupled to the fifth generator, the fifth generator control unit coupled to receive generator commands and operable, upon receipt thereof, to control the electrical energy generated by the fifth generator, whereby rotational energy extraction from the first gas turbine engine intermediate pressure turbine, by the fifth generator, is controlled;

a sixth generator control unit electrically coupled to the sixth generator, the sixth generator control unit coupled to receive generator commands and operable, upon receipt thereof, to control the electrical energy generated by the sixth generator, whereby rotational energy extraction from the second gas turbine engine intermediate pressure turbine, by the sixth generator, is controlled, wherein the engine power extraction control circuit is further operable to supply the generator commands to the fifth and sixth generator control units.

7. The system of claim 1, wherein the engine power extraction control circuit is further operable to supply auxiliary power unit (APU) starter-generator commands, and wherein the system further comprises:

an APU including:
an APU turbine adapted to receive a flow of combusted gas and operable, upon receipt thereof, to generate rotational energy;

an APU starter-generator coupled to the turbine and configured to selectively operate in either (i) a motor mode, in which electrical energy is converted to rotational energy and supplied to the turbine or (ii) a generator mode, in which the rotational energy generated by the turbine is converted to electrical energy; and a starter-generator control unit electrically coupled to the APU starter-generator, the APU starter generator coupled to receive the APU starter-generator commands and operable, in response thereto, to (i) selectively configure the APU starter-generator to operate in either the motor mode or the generator mode and (ii) when configuring the APU starter-generator to operate in the generator mode, control the electrical energy generated thereby.

8. The system of claim 7, wherein the engine power extraction control circuit is further operable to supply APU turbine commands, and wherein the system further comprises:

an APU controller electrically coupled to the APU turbine, the APU controller coupled to receive the APU turbine commands and operable, upon receipt thereof, to control the rotational energy generated by the APU turbine.

9. The system of claim 1, wherein the aircraft operational data include engine thrust setting, high pressure turbine rotational speed, low pressure turbine rotational speed, aircraft altitude, aircraft speed, aircraft electrical system configuration, and aircraft electrical system load.

10. An engine power extraction control system for an aircraft, comprising:

a left-side gas turbine engine including at least a high pressure turbine and a low pressure turbine, each turbine adapted to receive a flow of combusted gas and operable, upon receipt thereof, to generate rotational energy;

a right-side gas turbine engine including at least a high pressure turbine and a low pressure turbine, each turbine adapted to receive a flow of combusted gas and operable, upon receipt thereof, to generate rotational energy;

a first left-side generator coupled to receive at least a portion of the rotational energy generated by the left-side gas turbine engine high pressure turbine and operable, upon receipt thereof, to generate electrical energy;

a second left-side generator coupled to receive at least a portion of the rotational energy generated by the left-side gas turbine engine low pressure turbine and operable, upon receipt thereof, to generate electrical energy;

a first right-side generator coupled to receive at least a portion of the rotational energy generated by the right-side gas turbine engine high pressure turbine and operable, upon receipt thereof, to generate electrical energy;

a second right-side generator coupled to receive at least a portion of the rotational energy generated by the right-side gas turbine engine low pressure turbine and operable, upon receipt thereof, to generate electrical energy;

a first left-side generator control unit electrically coupled to the first left-side generator, the first left-side generator control unit coupled to receive generator commands and operable, upon receipt thereof, to control the electrical energy generated by the first left-side generator, whereby rotational energy extraction from the left-side gas turbine engine high pressure turbine, by the first left-side generator, is controlled;

a second left-side generator control unit electrically coupled to the second left-side generator, the second left-side generator control unit coupled to receive generator commands and operable, upon receipt thereof, to control the electrical energy generated by the second left-side generator, whereby rotational energy extraction from the left-side gas turbine engine low pressure turbine, by the second left-side generator, is controlled;

a first right-side generator control unit electrically coupled to the first right-side generator, the first right-side generator control unit coupled to receive generator commands and operable, upon receipt thereof, to control the electrical energy generated by the first right-side generator, whereby rotational energy extraction from the right-side gas turbine engine high pressure turbine, by the first right-side generator, is controlled;

a second right-side generator control unit electrically coupled to the second right-side generator, the second right-side generator control unit coupled to receive generator commands and operable, upon receipt thereof, to control the electrical energy generated by the second right-side generator, whereby rotational energy extraction from the right-side gas turbine engine low pressure turbine, by the second right-side generator, is controlled; and an engine power extraction control circuit adapted to receive aircraft operational data representative of aircraft thrust and electrical load requirements and operable, upon receipt thereof, to supply the generator commands to the left-side first and second generator control units and to the right-side first and second generator control units.

11. The system of claim 10, wherein the left-side and right-side gas turbine engines each further include an intermediate pressure turbine that is adapted to receive a flow of combusted gas and operable, upon receipt thereof, to generate rotational energy, and wherein the system further comprises:

a third left-side generator coupled to receive at least a portion of the rotational energy generated by the left-side gas turbine engine intermediate pressure turbine and operable, upon receipt thereof, to generate electrical energy;

a third right-side generator coupled to receive at least a portion of the rotational energy generated by the right-side gas turbine engine intermediate pressure turbine and operable, upon receipt thereof, to generate electrical energy;

a third left-side generator control unit electrically coupled to the third left-side generator, the third left-side generator control unit coupled to receive generator commands and operable, upon receipt thereof, to control the electrical energy generated by the third left-side generator, whereby rotational energy extraction from the left-side gas turbine engine intermediate pressure turbine, by the third left-side generator, is controlled;

a third right-side generator control unit electrically coupled to the third right-side generator, the third right-side generator control unit coupled to receive generator commands and operable, upon receipt thereof, to control the electrical energy generated by the third right-side generator, whereby rotational energy extraction from the right-side gas turbine engine intermediate pressure turbine, by the third right-side generator, is controlled, wherein the engine power extraction control circuit is further operable to supply the generator commands to the third left-side and third right-side generator control units.

12. The system of claim 10, wherein the engine power extraction control circuit is further operable to supply auxiliary power unit (APU) starter-generator commands, and wherein the system further comprises:

an APU including:
an APU turbine adapted to receive a flow of combusted gas and operable, upon receipt thereof, to generate rotational energy;
an APU starter-generator coupled to the turbine and configured to selectively operate in either (i) a motor mode, in which electrical energy is converted to rotational energy and supplied to the turbine or (ii) a generator mode, in which the rotational energy generated by the turbine is converted to electrical energy; and a starter-generator control unit electrically coupled to the APU starter-generator, the APU starter generator coupled to receive the APU starter-generator commands and operable, in response thereto, to (i) selectively configure the APU starter-generator to operate in either the motor mode or the generator mode and (ii) when configuring the APU starter-generator to operate in the generator mode, control the electrical energy generated thereby.

13. The system of claim 11, wherein the engine power extraction control circuit is further operable to supply APU turbine commands, and wherein the system further comprises:

an APU controller electrically coupled to the APU turbine, the APU controller coupled to receive the APU turbine commands and operable, upon receipt thereof, to control the rotational energy generated by the APU turbine.

14. The system of claim 10, wherein:

the first left-side generator is a starter-generator that is configured to selectively operate in either (i) a motor mode, in which electrical energy is converted to rotational energy and supplied to the left-side gas turbine engine high pressure turbine or (ii) a generator mode, in which the rotational energy supplied thereto from the left-side gas turbine high pressure turbine is converted to electrical energy;

the first right-side generator is a starter-generator that is configured to selectively operate in either (i) a motor mode, in which electrical energy is converted to rotational energy and supplied to the right-side gas turbine engine high pressure turbine or (ii) a generator mode, in which the rotational energy supplied thereto from the right-side gas turbine high pressure turbine is converted to electrical energy;

the first left-side generator control unit is further operable to selectively configure the first left-side generator to operate in either the motor mode or the generator mode; and the first right-side generator control unit is further operable to selectively configure the first right-side generator to operate in either the motor mode or the generator mode.

15. The system of claim 10, wherein the aircraft operational data include engine thrust setting, high pressure turbine rotational speed, low pressure turbine rotational speed, aircraft altitude, aircraft speed, aircraft electrical system configuration, and aircraft electrical system load.

16. In an aircraft having a gas turbine engine that includes at least a high pressure turbine and a low pressure turbine each operable to generate rotational energy, a method of controlling rotational energy extracted from each turbine, comprising the steps of:
   converting an amount of the rotational energy generated by the high pressure turbine into electrical energy;
   converting an amount of the rotational energy generated by the low pressure turbine into electrical energy;
   determining a plurality of aircraft operational parameters; and
   based on the determined aircraft operational parameters:
      (i) controlling the amount of rotational energy generated the high pressure turbine that is converted into electrical energy, to thereby control the rotational energy extracted from the high pressure turbine, and
      (ii) controlling the amount of rotational energy generated the low pressure turbine that is converted into electrical energy, to thereby control the rotational energy extracted from the low pressure turbine.

17. The method of claim 16, further comprising:
   controlling the amount of rotational energy generated by the high pressure turbine and the low pressure turbine, based at least in part on the determined aircraft operational parameters.

18. The method of claim 16, wherein the gas turbine engine further includes an intermediate pressure turbine that is operable to generate rotational energy, and wherein the method further comprises:
   converting an amount of the rotational energy generated by the high pressure turbine into electrical energy; and
   based on the determined aircraft operational parameters, controlling the amount of rotational energy generated the intermediate pressure turbine that is converted into electrical energy, to thereby control the rotational energy extracted from the intermediate pressure turbine.

19. The method of claim 16, wherein the aircraft operational parameters include engine thrust setting, high pressure turbine rotational speed, low pressure turbine rotational speed, aircraft altitude, aircraft speed, aircraft electrical system configuration, and aircraft electrical system load.

* * * * *